(12) United States Patent
Kondratiev

(10) Patent No.: US 9,178,965 B2
(45) Date of Patent: Nov. 3, 2015

(54) SYSTEMS AND METHODS FOR SYNCHRONIZATION OF APPLICATION COMMUNICATIONS

(75) Inventor: Vladimir Kondratiev, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 1035 days.

(21) Appl. No.: 13/288,928

(22) Filed: Nov. 3, 2011

(65) Prior Publication Data

US 2012/0236772 A1 Sep. 20, 2012

Related U.S. Application Data

(60) Provisional application No. 61/454,457, filed on Mar. 18, 2011, provisional application No. 61/503,395, filed on Jun. 30, 2011.

(51) Int. Cl.
| | |
|---|---|
| *H04Q 7/00* | (2006.01) |
| *H04L 29/08* | (2006.01) |
| *H04L 12/875* | (2013.01) |
| *H04W 4/00* | (2009.01) |

(52) U.S. Cl.
CPC ............ *H04L 67/325* (2013.01); *H04L 47/56* (2013.01); *G06F 2209/542* (2013.01); *H04L 67/1095* (2013.01); *H04L 67/34* (2013.01); *H04W 4/001* (2013.01); *H04W 4/003* (2013.01)

(58) Field of Classification Search
None
See application file for complete search history.

(56) References Cited

U.S. PATENT DOCUMENTS

| | | | |
|---|---|---|---|
| 5,737,687 | A | 4/1998 | Martin et al. |
| 6,115,744 | A | 9/2000 | Robins et al. |
| 6,122,514 | A | 9/2000 | Spaur et al. |
| 6,181,919 | B1 | 1/2001 | Ozluturk |
| 6,198,911 | B1 | 3/2001 | Lea et al. |
| 7,065,367 | B2 | 6/2006 | Michaelis et al. |

(Continued)

FOREIGN PATENT DOCUMENTS

| | | |
|---|---|---|
| CN | 102186167 A | 9/2011 |
| EP | 2019517 A1 | 1/2009 |

(Continued)

OTHER PUBLICATIONS

Ananthanarayaran G., et al ., "A New Communications API", Electrical Engineering and Computer SciencesUniversity of California at Berkeley, May 25, 2009, pp. 1-14, XP002676108, Retrieved from the Internet: URL:http://www.eecs.berkeley.edu/Pubs/Tech Rpts/2009/EECS-2009-84.pdf [retrieved on May 16, 2012].

(Continued)

*Primary Examiner* — Duc C Ho
(74) *Attorney, Agent, or Firm* — Ke Liu

(57) ABSTRACT

Systems, methods, and devices for managing application communications are described herein. In some aspects, a wireless device is configured to execute a plurality of applications and to communicate with a communication network. The wireless device includes a processor configured to receive information from an application, via an application programming interface. The information is indicative of a transmit delay tolerance. The processor is further configured to receive, via the application programming interface, a packet from the application. The wireless device further includes a network driver configured to determine when to transmit the packet based on the received transmit delay tolerance.

28 Claims, 10 Drawing Sheets

(56) References Cited

U.S. PATENT DOCUMENTS

| | | | |
|---|---|---|---|
| 7,107,063 B1 | 9/2006 | Bates et al. |
| 7,251,490 B2 | 7/2007 | Rimoni |
| 7,486,954 B2 | 2/2009 | Lee et al. |
| 7,552,441 B2 | 6/2009 | Lim et al. |
| 7,610,057 B2 | 10/2009 | Bahl et al. |
| 7,664,838 B2 | 2/2010 | Monga et al. |
| 7,756,068 B2 | 7/2010 | Tao et al. |
| 7,769,887 B1 | 8/2010 | Bhattacharyya et al. |
| 7,860,469 B2 | 12/2010 | Mohanty et al. |
| 7,873,746 B2 | 1/2011 | Li |
| 7,940,735 B2 | 5/2011 | Kozisek et al. |
| 7,990,897 B2 | 8/2011 | Jing et al. |
| 8,312,531 B2 | 11/2012 | Walter et al. |
| 8,831,658 B2 * | 9/2014 | Meylan et al. | 455/509 |
| 2002/0001292 A1 | 1/2002 | Miyamoto |
| 2002/0052790 A1 * | 5/2002 | Tomishima | 705/15 |
| 2002/0095524 A1 | 7/2002 | Sanghvi et al. |
| 2002/0123356 A1 | 9/2002 | Michaud et al. |
| 2003/0134632 A1 | 7/2003 | Loughran |
| 2003/0153317 A1 | 8/2003 | Friman et al. |
| 2004/0009751 A1 | 1/2004 | Michaelis et al. |
| 2004/0097254 A1 | 5/2004 | Laroia et al. |
| 2004/0158729 A1 | 8/2004 | Szor |
| 2004/0172481 A1 | 9/2004 | Engstrom |
| 2004/0192391 A1 | 9/2004 | Nagai |
| 2004/0264396 A1 | 12/2004 | Ginzburg et al. |
| 2005/0060583 A1 | 3/2005 | Lin |
| 2005/0149376 A1 | 7/2005 | Guyan et al. |
| 2005/0182958 A1 | 8/2005 | Pham et al. |
| 2006/0155856 A1 | 7/2006 | Nakashima et al. |
| 2006/0217116 A1 | 9/2006 | Cassett et al. |
| 2006/0221953 A1 | 10/2006 | Basso et al. |
| 2006/0274750 A1 | 12/2006 | Babbar et al. |
| 2007/0174469 A1 | 7/2007 | Andress et al. |
| 2007/0178876 A1 | 8/2007 | Yaqub et al. |
| 2007/0201369 A1 | 8/2007 | Pedersen et al. |
| 2007/0245171 A1 | 10/2007 | Ohly et al. |
| 2007/0286222 A1 | 12/2007 | Balasubramanian |
| 2007/0294410 A1 | 12/2007 | Pandya et al. |
| 2008/0019339 A1 | 1/2008 | Raju et al. |
| 2008/0102815 A1 | 5/2008 | Sengupta et al. |
| 2008/0183857 A1 | 7/2008 | Barfield et al. |
| 2008/0234012 A1 | 9/2008 | Liu et al. |
| 2009/0005127 A1 | 1/2009 | Frenger et al. |
| 2009/0022095 A1 | 1/2009 | Spaur et al. |
| 2009/0049518 A1 | 2/2009 | Roman et al. |
| 2009/0183186 A1 | 7/2009 | Murtagh |
| 2009/0296641 A1 | 12/2009 | Bienas et al. |
| 2009/0318124 A1 | 12/2009 | Haughn |
| 2009/0325512 A1 | 12/2009 | Granlund et al. |
| 2010/0045422 A1 | 2/2010 | Teng et al. |
| 2010/0142477 A1 | 6/2010 | Yokota |
| 2010/0144332 A1 | 6/2010 | Savoor |
| 2010/0231383 A1 | 9/2010 | Levine et al. |
| 2010/0279745 A1 | 11/2010 | Westcott et al. |
| 2010/0285776 A1 | 11/2010 | De |
| 2010/0287281 A1 | 11/2010 | Tirpak |
| 2010/0322124 A1 | 12/2010 | Luoma et al. |
| 2011/0003592 A1 | 1/2011 | Matsumoto |
| 2011/0019557 A1 * | 1/2011 | Hassan et al. | 370/252 |
| 2011/0028085 A1 | 2/2011 | Waung et al. |
| 2011/0029658 A1 | 2/2011 | Werth et al. |
| 2011/0054879 A1 | 3/2011 | Bogsanyl et al. |
| 2011/0149797 A1 | 6/2011 | Taaghol et al. |
| 2011/0182220 A1 | 7/2011 | Black et al. |
| 2011/0185202 A1 | 7/2011 | Black et al. |
| 2011/0188394 A1 | 8/2011 | Seo |
| 2011/0201285 A1 | 8/2011 | Giaretta et al. |
| 2012/0020266 A1 | 1/2012 | Sun et al. |
| 2012/0129503 A1 | 5/2012 | Lindeman et al. |
| 2012/0134361 A1 | 5/2012 | Wong et al. |
| 2012/0185577 A1 | 7/2012 | Giaretta et al. |
| 2012/0214527 A1 | 8/2012 | Meylan et al. |
| 2012/0257512 A1 | 10/2012 | Lim |
| 2012/0270538 A1 | 10/2012 | Meylan et al. |
| 2013/0052965 A1 | 2/2013 | Meylan et al. |
| 2013/0053013 A1 | 2/2013 | Giaretta et al. |
| 2013/0165181 A1 | 6/2013 | Hasegawa |
| 2013/0217331 A1 | 8/2013 | Manente |
| 2013/0217357 A1 | 8/2013 | Menezes et al. |
| 2013/0225100 A1 | 8/2013 | Chen et al. |
| 2014/0286256 A1 * | 9/2014 | Chowdhury et al. | 370/329 |

FOREIGN PATENT DOCUMENTS

| | | | |
|---|---|---|---|
| JP | H10178453 A | 6/1998 |
| JP | 2001339465 A | 12/2001 |
| JP | 2002091841 A | 3/2002 |
| JP | 2004509539 A | 3/2004 |
| JP | 2004297218 A | 10/2004 |
| JP | 2008048072 A | 2/2008 |
| JP | 2008072568 A | 3/2008 |
| JP | 2008187377 A | 8/2008 |
| JP | 2009021966 A | 1/2009 |
| JP | 2009038653 A | 2/2009 |
| JP | 2009182443 A | 8/2009 |
| JP | 2009540687 A | 11/2009 |
| JP | 2010074818 A | 4/2010 |
| JP | 2010183414 A | 8/2010 |
| JP | 2011530860 A | 12/2011 |
| JP | 2012529807 A | 11/2012 |
| WO | 0223362 A1 | 3/2002 |
| WO | 03036491 A1 | 5/2003 |
| WO | 2007146549 A2 | 12/2007 |
| WO | 2008011420 A1 | 1/2008 |
| WO | 2009096410 A1 | 8/2009 |
| WO | 2010016849 A1 | 2/2010 |
| WO | 2011023096 A1 | 3/2011 |
| WO | 2011146831 A1 | 11/2011 |

OTHER PUBLICATIONS

Andrea Passarella: "Power Management Policies for Mobile Computing", Feb. 1, 2005, pp. 1-151, XP055019616, Retrieved from the Internet: URL:http://cnd.iit.cnr.it/andrea/docs/passarella_phd_thesis.pdf [retrieved-on Feb. 16, 2012] * chapter 5.3, 5.3.1.

Chen L., et al., "QoS aware power efficiency in IEEE 802.11 LAN", Consumer Communications and Networking Conference, 2005. CCNC. 2005 Second IEEE, IEEE, Piscataway, NJ, USA, Jan. 3, 2005, pp. 85-90, XP010787616, DOI: 10.1109/CCNC.2005. 1405149, ISBN: 978-0-7803-8784-3 * chapter III C * figures 3-2.

Hare, et al., "A Network-Assisted System for Energy Efficiency in Mobile Devices," 2011 Third International Conference on Communication Systems and Networks, COMSNETS, pp. 1-10, Jan. 2011.

International Search Report and Written Opinion—PCT/US2011/059445—ISA/EPO—May 30, 2012.

Kravets R et al: "Application-Driven Power Management for Mobile Communication" Wireless Networks, ACM, New York, NY, US, vol. 6, No. 4, Sep. 2000, pp. 263-277, XP001036334 ISSN: 1022-0038.

Liu China MOB1 Le Yuri Ismai Lov Ericsson Z Cao China Mobile D: "Socket API Extension for MIF Host; draft-liu-mif-api-extension-03.txt", Socket API Extension for MIF Host; draft-liu-mi f-api-extension-03.txt, Internet Engineering Task Force, IETF; Standardworkingdraft, Internet Society (ISOC) 4, Rue Des Falaises CH—1205 Geneva, Switzerland, No. 3, Oct. 25, 2010, pp. 1-8, XP015072273, [retrieved on Oct. 25, 2010] abstract* chapters 3-7 * figure 1.

Liu China Mobile Yuri Ismailov Ericsson Z Cao China Mobile D: "Socket API Extension for MIF Host; draft-liu-mif-api-extension-04.txt", Socket API Extension for MIF Host; draft-liu-mif-api-extension-04.txt, Internet Engineering Task Force, IETF; Standardworkingdraft, Internet Society (ISOC) 4, Rue Des Falaises CH—1205 Geneva, Switzerland, No. 4, Mar. 15, 2011, pp. 1-9, XP015074974, [ retrieved on Mar. 15, 2011] abstract *chapter 3-5 * figure 1.

Liu H., et al: "TailTheft: Leveraging the Wasted Time for Saving Energy in Cellular Communications", MobiArch '11 Proceedings of the sixth international workshop on MobiArch Jun. 28, 2011, pp. 31-36, XP002676107, ISBN: 978-1-4503-0740-6 Retrieved from the Internet: URL:http://delivery.acm.org/10.1145/2000000/1999925/p31-liu.pdf"ip=      145.64.134.245&acc=ACTIVE%20SERVICE

(56) References Cited

OTHER PUBLICATIONS

&CFID=103451177&CFTOKEN=63558822&__acm__=1337160633_c5b6dc53c6b1c9 77ac53b9dfb0180831 [retrieved on May 16, 2012].
Larsson H Levkowetz H Mahkonen T Kauppinen Ericsson C: "A Filter Rule Mechanism for Multi-access Mobile IPv6; draft-larsson-monami 6—filter-rules-02.txt" IETF Standard-Working-Draft, Internet Engineering Task Force, IETF, CH, No. 2, Mar. 5, 2007, XP015050112, ISSN: 0000-0004.
Pering T., et al., "Coolspots: Reducing the Power Consumption of Wireless Mobile Devices With Multiple Radio Interfaces," the 4th. International Conference on Mobile Systems, Applications and Services, Jun. 19-22, 2006, pp. 220-232.

\* cited by examiner

SYSTEMS AND METHODS FOR SYNCHRONIZATION OF APPLICATION COMMUNICATIONS

CROSS-REFERENCES TO RELATED APPLICATIONS

This application claims the benefit under 35 U.S.C. §119 (e) to U.S. Provisional Patent Application No. 61/454,457, entitled "CONNECTIVITY MANAGEMENT FOR APPLICATIONS ON A USER DEVICE," filed on Mar. 18, 2011, and to U.S. Provisional Patent Application No. 61/503,395 entitled "Controlling Application Access to a Network," filed on Jun. 30, 2011, the disclosures of which are expressly incorporated by reference herein in their entireties.

BACKGROUND

1. Field

The present application relates generally to wireless communications, and more specifically to systems, methods, and devices for synchronizing application communications.

2. Background

Applications ("apps") or device applets are now available that operate to provide a wide range of add-on services and features to wireless devices. For example, it is now possible for wireless devices to download and launch device applets to perform value-added functions such as shopping, searching, position location, driving navigation, and an array of other functions. Network and application providers generally offer these device applets to device users for additional fees. Thus, the use of device applets increases the functionality and usability of wireless devices and offers device users features and convenience not originally available on the devices themselves.

A wireless device interfaces with one or more communication networks using any of a plurality of radios. For example, the wireless device may include a variety of radios providing communications using cellular, Wi-Fi, Bluetooth or other types of radio access technologies. Accordingly, applications executing on the wireless device are provided with a default routing that determines the radio and associated radio channel the applications will use to communicate with the appropriate network.

There is an increased interest, however, in intelligently managing application communications. This is due, in part, to an increase in the number of multi-radio devices (e.g. 3G/Wi-Fi devices) and an increase in network traffic that may create capacity problems for operators, and power consumption problems for users. Thus, with respect to such capacity and power consumption problems, it may be desirable to delay communications during certain periods.

Accordingly, there is a need for efficient and cost effective mechanisms to provide communication management for applications on wireless devices. Specifically, there is a need for systems and methods of managing policies regarding delayed transmission of communications.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Description" one will understand how the features of this invention provide advantages that include management of application communication delay tolerance.

One aspect of the disclosure provides a method of aggregating data for transmission. The method includes receiving information from an application via an application programming interface. The information is indicative of a transmit delay tolerance. The method further includes receiving, via the application programming interface, a packet from the application. The method further includes determining when to transmit the packet based on the received transmit delay tolerance.

Another aspect of the disclosure provides a wireless device for aggregating data for transmission. The wireless device includes a processor configured to receive information from an application via an application programming interface. The information is indicative of a transmit delay tolerance. The processor is further configured to receive, via the application programming interface, a packet from the application. The wireless device further includes a network driver configured to determine when to transmit the packet based on the received transmit delay tolerance.

Another aspect of the disclosure provides a wireless device for aggregating data for transmission. The wireless device includes means for receiving information from an application via an application programming interface. The information is indicative of a transmit delay tolerance. The wireless device further includes means for receiving, via the application programming interface, a packet from the application. The wireless device further includes means for determining when to transmit the packet based on the received transmit delay tolerance.

Another aspect of the disclosure provides a non-transitory computer-readable medium having instruction encoded thereon which, when executed, cause an apparatus to perform a method of aggregating data for transmission. The method includes receiving information from an application, via an application programming interface. The information is indicative of a transmit delay tolerance. The method further includes receiving, via the application programming interface, a packet from the application. The method further includes determining when to transmit the packet based on the received transmit delay tolerance.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
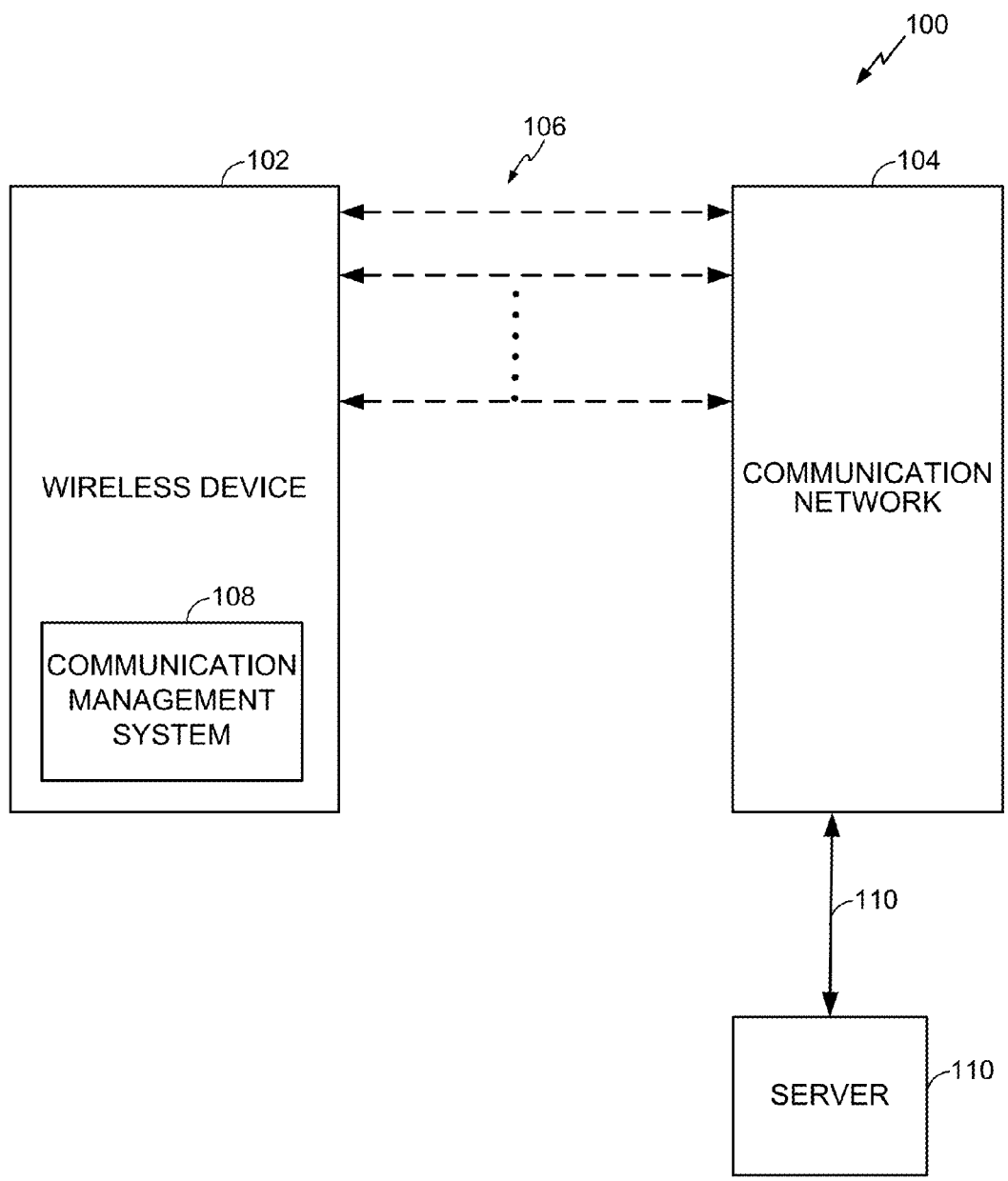
FIG. 1 shows an exemplary network environment illustrating aspects of a communication management system.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.15, IEEE 802.16, IEEE 802.20, Flash-OFDM®, etc. UTRA, E-UTRA, and GSM are part of Universal Mobile Telecommunication management system (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

FIG. 1 shows an exemplary network environment 100 illustrating aspects of a communication management system 108. The network environment 100 includes a wireless device 102, a communication network 104, and a server 110. The device 102 includes a plurality of radios/interfaces (not shown) to communicate with the network 104 using corresponding radio/interface channels 106. The device 102 also includes a communication management system 108 that operates to control access to the plurality of radios/interfaces, for example by a particular application.

The wireless device 102 may communicate with the server 110 via the communication network 104. The server 110 connects to the communication network 104 via a communication channel 112. The communication channel 112 may be either a wired or wireless channel.

During operation, the wireless device 102 executes applications which may interface with the network 104 using any of the plurality of radios/interfaces. For example, an executing application may issue a networking function call, such as a socket layer call, to request a network resource for communication with the network 104. In an embodiment, the communication management system 108 may process the socket layer call based on a default routing configuration to bind a pre-determined radio/interface resource to the application.

The application may transmit one or more packets of data, for example, via the communication channel 112 to the server 110. In an embodiment, the application may include a transmit delay tolerance parameter in the transmitted packets. The transmit delay tolerance parameter may be included in, for example, a header of each packet. The transmit delay tolerance parameter may indicate an allowable delay for application communication. For example, applications that occasionally access the server 110 for updates, such as social media applications, may be relatively delay-tolerant. On the other hand, interactive applications, such as video chat or web browsing applications, may be relatively delay-intolerant.

In various embodiments, the transmit delay tolerance parameter may indicate the allowable delay demarcated in a number of temporal units such as, for example, minutes, seconds, milliseconds, microseconds, symbols, clock ticks, frame periods, etc. In an embodiment, the transmit delay tolerance parameter may indicate the allowable delay demarcated as a relative priority value (e.g., high, medium, or low). In an embodiment, the transmit delay tolerance parameter may indicate a maximum allowable number of packets that may be delayed at one time. In various embodiments, the transmit delay tolerance parameter may indicate the maximum allowable number of delayed packets from a single application, or as an aggregate of all application traffic.

The application may generate the transmit delay tolerance for a packet based on a number of factors, including user preferences, whether the application is running in the foreground or the background, or the time of day. The application can set the transmit delay tolerance differently for different types of packets, e.g., FIN packets or content packets. The transmit delay tolerance may be set for each packet individually or may be set by an application using an application programming interface (API) to define kernel metadata regarding future generated packets of a particular type.

In various implementations, the communication management system 108 operates to intercept packets from the application. For example, the communication management system 108 may receive packets from the application via an application programming interface (API). The communication management system 108 may modify communications of the application according to the transmit delay tolerance parameter in each intercepted packet. As used herein, modification of communications can include, but is not limited to, delaying communications or otherwise impacting or affecting communications.

In embodiments where the communication management system 108 delays communications according to the delay tolerance parameter, the communication management system 108 may disable one or more radios/interfaces in order to conserve power. After the delay, the communication management system 108 may power-up one or more disabled radios/interfaces. The communication management system 108 may then bind the application to a network resource (i.e., the radio/interface that has been selected). A more detailed description of the communication management system 108 is provided below.

Figure 2:
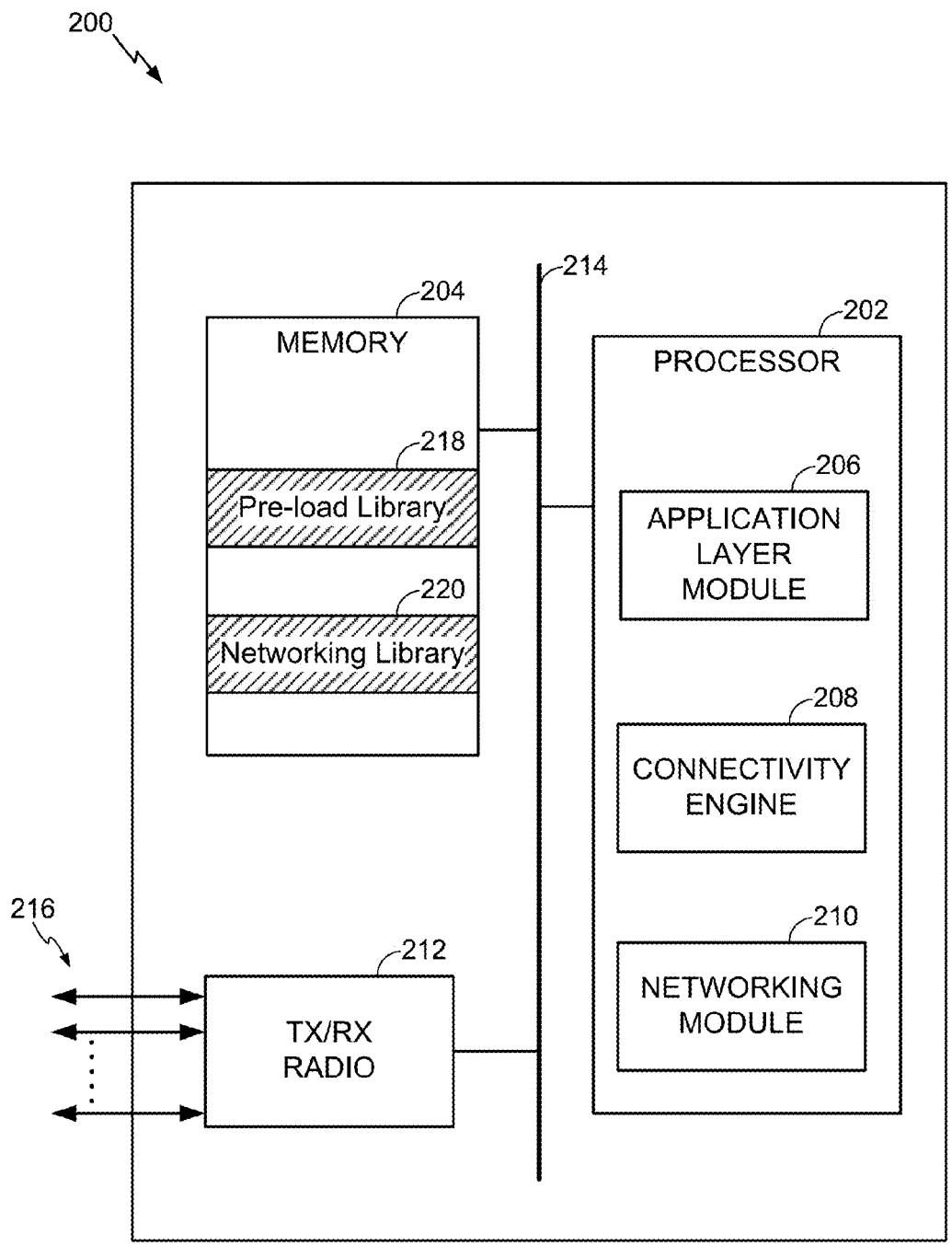
FIG. 2 shows an exemplary wireless device configured to provide communication management.

FIG. 2 shows an exemplary wireless device 200 configured to provide communication management. The device 200 includes a processor 202, a memory 204, and a TX/RX radio 212, all coupled to communicate using a communication bus 214. The wireless device 200 may be the wireless device 102, described above with respect to FIG. 1. It should be noted that the device 200 is just one implementation and that other implementations are possible.

In one aspect, the processor 202 includes an application layer module 206, a connectivity engine 208, and a networking module 210. The processor 202 may also include at least one of a CPU, microprocessor, gate array, hardware logic, memory elements, and/or hardware executing software (not shown). The processor 202 is configured to control the operation of the device 200 such that communications of applications executing on the device 200 may be selectively modified, impacted, delayed and/or bound to a desired radio. In one implementation, the processor 202 is configured to execute computer-readable instructions related to performing any of a plurality of functions. For example, the processor 202 operates to analyze information received or communicated from the device 200 to effectuate communication management. In another aspect, the processor 202 operates to generate information that may be utilized by the memory 204, the application layer module 206, the TX/RX radio 212, and/or connectivity engine 208 to effectuate communication management.

The TX/RX radio 212 includes hardware and/or a processor executing software that is configured to provide a plurality of radios/interfaces that may be used to interface the device 200 with a plurality of external entities, such as the external communication network 104 (FIG. 1) using a plurality of radio channels 216. The radio channels 216 may be, for example, the radio channels 106 described above with respect to FIG. 1. The TX/RX radio 212 may provide radios/interfaces to communicate using cellular, Wi-Fi, Bluetooth, or any other technologies to communicate with communication networks using the radio channels 216. The radios/interfaces of the TX/RX radio 212 may be selectively enabled and disabled, for example to conserve power when there is no data to be transmitted.

The application layer module 206 includes hardware and/or a processor executing software that is configured to execute one or more applications on the device 200 and to store the applications in the memory 204. In one implementation, the application layer module 206 is configured to allow applications to initiate networking function calls to the networking module 210 to request networking services. The networking function calls may include a connection request to a radio/interface at the TX/RX radio 212 for the purpose of communicating with an external network or system via the radio channels 216.

The networking module 210 includes hardware and/or a processor executing software that is configured to perform networking functions. In one implementation, the networking functions include such functions as connect( ), Bind( ), write( ), and Setsockopt( ). The connect( ) function operates to establish a connection between an application and a particular radio/interface. The write( ) function operates to send data over the connection. For example, a particular radio/interface may be selected from the plurality of candidate radios provided by the TX/RX radio 212. In an embodiment, the Setsockopt( ) function may be used to set the delay tolerance parameter. In an aspect, networking module 210 is configured to perform a variety of networking functions or commands. In one aspect, the networking module 210 may allow certain functions to proceed, and may not allow other functions to proceed, based on, for example, the delay tolerance parameter.

The connectivity engine 208 includes hardware and/or a processor executing software that is configured to assess system resources to manage communication from applications. In various implementations, the connectivity engine 208 is configured to intercept application communication, selectively modify, impact, and/or delay the communication, and/or select a particular radio based on one or more of the following selection criteria.

1. User Policy—policy set by the device user regarding radio access by applications executing at the device.
2. Operator Policy—policy set by network operators regarding network access by devices or applications.
3. Radio metrics—measurements of radio performance or other types of measurements that are used to select the most preferred radio for a particular application or operating environment.
4. Application requirements—requirements associated with requesting applications, such as bandwidth requirements or latency/performance requirements. Application requirements may include, for example, the delay tolerance parameter.
5. Network usability—information regarding the availability of a particular network on a particular radio interface.
6. Vendor Supplied Metrics—information to translate from radio metrics such as Receive Signal Strength Indication and Packet Loss Rate to the throughput and latency available for a particular radio interface.
7. Access Point Availability—information specifying the unique identifier for access points congested by the traffic from other devices or those that may configure a radio link but do not forward packets to the network.

The processor 202 may download one or more of the aforementioned selection criteria via the TX/RX radio 212. The selection criteria may be stored in the memory 204. For example, the processor 202 may retrieve the operator policy and the connectivity engine 208 may apply the operator policy. The operator policy may include a plurality of rules regulating network access by applications on the wireless device 200.

The memory 204 includes RAM, ROM, EEPROM or any other type of memory device that operates to allow the applications and/or the selection criteria to be stored and retrieved at the device 200. In one implementation, the memory 204 is configured to store computer-readable instructions executed by processor 202. The memory 204 may also be configured to store any of a plurality of other types of data including data generated by any of the processor 202, TX/RX radio 212, application layer module 206, networking module 210, and/or connectivity engine 208. The memory 204 may be configured in a number of different configurations, including as random access memory, battery-backed memory, hard disk, magnetic tape, etc. Various features may also be implemented upon memory 204, such as compression and automatic back up.

The memory 204 is configured to store a pre-load library 218 and a networking library 220. The pre-load library 218 intercepts socket calls from applications. The networking library 220 provides the networking API used by applications to create and connect sockets to establish network communications.

The connectivity engine 208 is configured to selectively modify, impact, and/or delay application communication in various ways. For example, the connectivity engine 208 may be configured to delay communication using one or more of the above selection criteria. For example, the connectivity engine 208 may delay only communication from delay-tolerant applications, based on the delay tolerance parameter.

In an embodiment, the connectivity engine 208 may delay communication based on whether the wireless device 200 is in an idle state. In an embodiment, the connectivity engine 208 delays communication for delay-tolerant applications until the wireless device 200 enters an active state. In another embodiment, the connectivity engine 208 delays communication for delay-tolerant applications until a delay-intolerant application initiates communication.

The connectivity engine 208 may also be configured to select a radio from the plurality of candidate radios in various ways. For example, the connectivity engine 208 may be configured to select a radio using one or more of the above selection criteria. In an embodiment, the connectivity engine 208 may selectively enable/disable one or more radios, for example, to save power when application communications are being delayed. When application communications are not being delayed, the connectivity engine 208 binds the application to the interface representing that radio. For example, in one implementation, the connectivity engine 208 binds the application to the radio's interface by calling into the original networking library 220. Thus, functions at the connectivity engine 208 and the pre-load library 218 may easily access functions, such as a bind( ) function, in the networking library 220 to bind to the radio that has been selected for the application.

In various implementations, the communication management system includes a computer program product having one or more program instructions ("instructions") or sets of "codes" stored or embodied on a computer-readable medium. When the codes are executed by at least one processor, for instance, processor 202, their execution causes the processor 202 to control the device 200 to provide the functions of the intelligent interface selection system described herein. For example, the computer-readable medium includes a floppy disk, CDROM, memory card, FLASH memory device, RAM, ROM, or any other type of memory device or computer-readable medium that interfaces to the device 200. In another aspect, the sets of codes may be downloaded into the device 200 from an external device or communication network resource. The sets of codes, when executed, operate to provide aspects of the intelligent interface selection system described herein.

Figure 3:
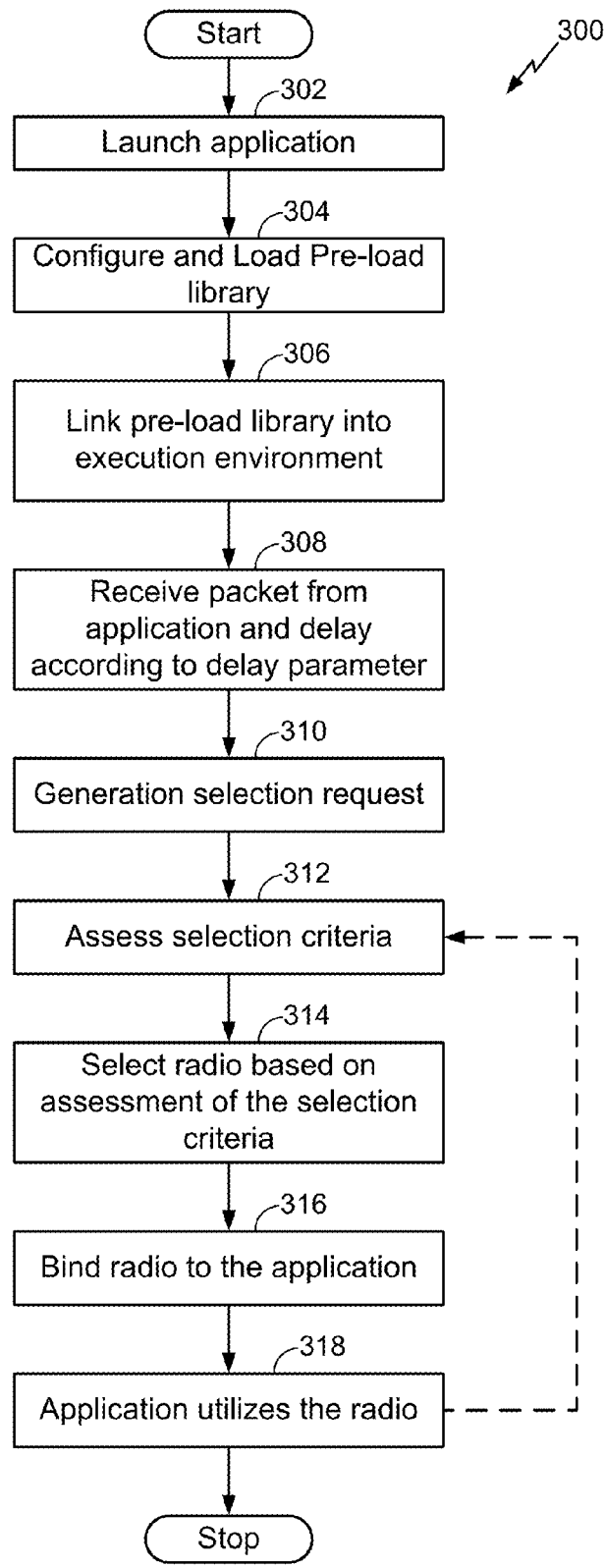
FIG. 3 shows a flowchart of an exemplary method of providing communication management.

FIG. 3 shows a flowchart 300 of an exemplary method of providing communication management. For clarity, the flowchart 300 is described below with reference to the device 200 shown in FIG. 2. However, a person having ordinary skill in the art will appreciate that the illustrated method can be implemented with any suitable device. In one implementation, the processor 202 executes one or more sets of codes to control the functional elements of the device 200 to perform the functions described below.

At block 302, the processor 202 launches an application. The application may be a legacy or non-legacy application that is part of the application layer module 206. For example, the application may be a network browser that generates a networking function call to connect to a wireless network using a radio available at the TX/RX radio 212.

At block 304, the processor 202 configures and loads a pre-load library. For example, the pre-load library 218 includes a subset of the networking functions that are provided in the networking library 220 used by applications to assess communication networks. The networking functions in the pre-load library 218 are configured to intercept networking function calls from applications executing at a device. For example, the pre-load library 218 includes POSIX socket functions that may be used to intercept socket calls by applications executing at the device 200. In one implementation, the pre-load library 218 in stored in memory 204.

In one implementation, the pre-load library 218 functions are configured to receive arguments passed from calling applications and use these arguments to generate a request to the connectivity engine 208 to select the radio best suited for the application's purpose.

At block 306, the processor 202 links the pre-load library into the execution environment. For example, the processor 202 links the pre-load library 218 into the execution environment at a higher priority than the networking library 220. Thus, networking functions calls by applications will be intercepted and processed by functions in the pre-load library 218 and not processed by similar functions in the networking library 220.

At block 308, the processor 202 receives a packet from the application. The processor 202 may also receive a transmit delay tolerance from the application. In an embodiment, the application may initiate transmission of the packet via an API using, for example, a networking function call. The networking function call may be a POSIX socket function call, such as the connect( ) function or the write( ) function. In an embodiment, the application may indicate a delay tolerance of the packet by setting the transmit delay tolerance. In an embodiment, the application may set the transmit delay tolerance using, for example, a setsockopt( ) function call.

In an embodiment, the application may generate the transmit delay tolerance for a packet based on a user preferences. For example, an application that receives periodic updates may allow a user to determine a minimum and maximum amount of time between updates. In another embodiment, the application may generate the transmit delay tolerance for a packet based whether the application is running in the foreground or the background. For example, the application may assign a lower delay tolerance when operating in the foreground, and a higher delay tolerance when operating in the background. In another embodiment, the application may generate the transmit delay tolerance for a packet based on the time of day. For example, the application may assign a higher delay tolerance to packets sent in the middle of the night.

In certain embodiments, the application can set the transmit delay tolerance differently for different types of packets. For example, a Web browsing application may set a relatively high transmit delay tolerance for FIN packets, and a relatively low transmit delay tolerance for content packets. Accordingly, FIN packets might be delayed until content packets reach their delay tolerance. In various embodiments, different transmit delay tolerances can be assigned to different packet types including, SYN packets, FIN packets, and data packets.

In an embodiment, the application may set the transmit delay tolerance for each packet individually. In another embodiment, the application may provide a delay policy via an application programming interface (API) to define kernel metadata regarding future generated packets of a particular type. The delay policy may include one or more rules, based on which the network stack may assign delay tolerances. For example, the application may provide a rule that the network stack should assign a particular delay tolerance to all FIN packets. The rules can include criteria including source application, destination host name, destination host address, source and destination port numbers, environment variables, etc.

The application generates the networking function call to connect to a radio to allow communication with external networks. Due to the linking of the pre-load library 218 into the execution environment at a higher priority than the networking library 220, the processor 202 intercepts (or processes) the networking function call via the functions in the pre-load library 218. In an embodiment, the processor 202 can delay the networking function call in accordance with the application delay parameter. Additional details are described herein, for example, with respect to FIG. 9.

At block 310, the called function in the pre-load library 218 generates a selection request to the connectivity engine 208 to select the appropriate radio for use by the application. The request includes any information that is part of the selection criteria used by the connectivity engine 208 to select the appropriate radio for use by the application. In another embodiment, the called function in the pre-load library 218 generates a selection request to the connectivity engine 208 to determine whether the communication should be delayed.

At block 312, selection criteria are assessed. In one implementation, the connectivity engine 208 operates to assess the selection criteria described above. For example, the connectivity engine 208 may communicate with the processor 202 to assess Operator Policies that are part of the selection criteria.

At block 314, the connectivity engine 208 selects a radio based on the assessment of the selection criteria. For example, the connectivity engine 208 operates to select the radio that best matches the selection criteria.

At block 316, the connectivity engine 208 binds to the radio's interface that has been selected for the application. For example, in one implementation, the connectivity engine 208 calls a bind( ) function of the networking library 220 to bind to the radio that has been selected for the application. For example, the connectivity engine 208 is aware of the networking library 220 and how to access its functions directly without being intercepted by the pre-load library 218. In an embodiment, the connectivity engine 208 delays communication prior or post to binding the application to the radio. In an embodiment, binding the radio may include enabling or powering-up a disabled or powered-down radio after delaying application communications.

At block 318, the application then utilizes the radio that has been selected for network communications.

In an optional operation, the method proceeds to block 312 where the connectivity engine 208 operates to perform periodic assessment of the selection criteria to determine if the current radio best matches the selection criteria. If the connectivity engine 208 determines after another assessment of the selection criteria that a radio other than the current radio best matches the selection criteria, then the connectivity engine 208 may destroy the connection as a means to trigger the application into restarting the connection to select a different radio for the new connection. Thus, the optional operation allows the selection criteria to be periodically assessed to assure that the most appropriate radio is selected to conduct the desired communication.

Therefore, the flowchart 300 provides communication management for use with legacy and non-legacy applications. It should be noted that the flowchart 300 is just one implementation and that the operations of the flowchart 300 may be rearranged or otherwise modified such that other implementations are possible.

Application Delay Management for Wireless Device Applications

In wireless devices such as smart phones, personal digital assistants, etc., software applications may run in the background, and may initiate network activity every few minutes. For example, a mailer application may cause the network driver to wake up the modem to transmit information every three minutes. A financial tracker application may cause the network driver to wake up the modem to transmit information every two minutes. Because of the different periods (and relative phases), the modem is woken more frequently than every two minutes, wasting power. Applications such as social networking applications, email or other communication applications, data feeds, etc. (popular examples include Facebook, Gmail, Market, Twitter, etc.) may send and receive data with varied periodicity.

Figure 4:
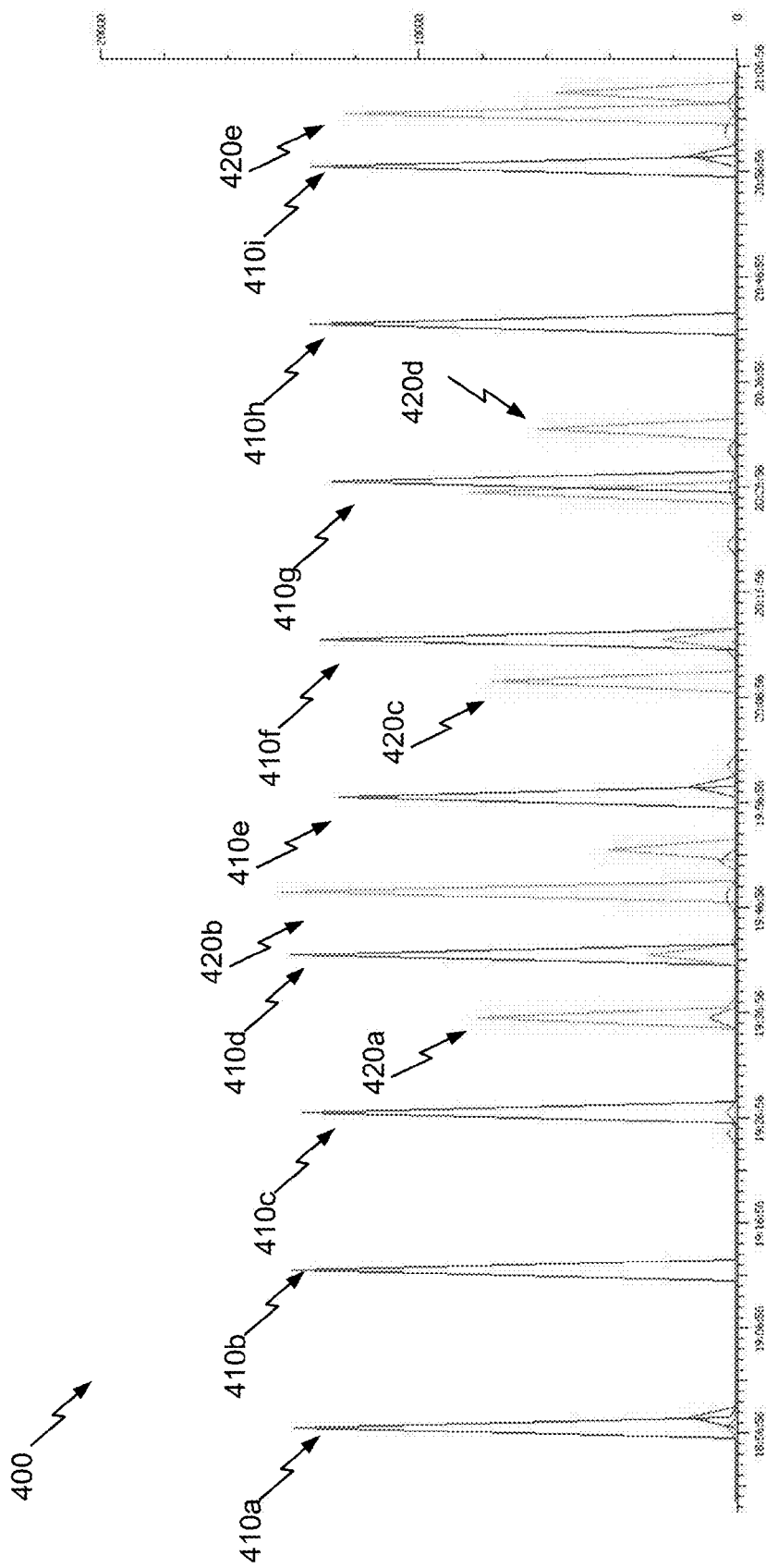
FIG. 4 shows a graph of application network activity for an exemplary device.

FIG. 4 shows a graph 400 of application network activity for an exemplary device. The x-axis of the graph 400 shows time, and the y-axis shows an amount of data transferred, in bytes, at each time. The graph 400 shows network activity during an approximately two-hour period, during which the device is in an idle mode. In an embodiment, the device is in an idle mode when a user does not interact with the device and/or a display is off. Although the device is in the idle mode, applications that continue to operate create spikes in activity, for example, first application spikes 410a-i. Such applications can be referred to as "background" applications. The activity by these applications may utilize communication resources such as the radios in radio 212, etc.

Network activity spikes, such as first application spikes 410a-i, may cause the wireless device to transition from the idle mode to a connected mode. In the connected mode, the device may power-up a radio, may generate signaling traffic, and may consume a greater amount of power than when in the idle mode. In some cases, the spikes may prevent the wireless device from transitioning from the connected mode to the idle mode, or to alternate connection modes such as a discontinuous reception (DRX) mode. Such elevated levels of radio activity by the applications when the user is not actively engaging the device may result in shortened battery life, increased load of radio networks, or other undesired effects. Moreover, different applications may generate traffic at different times, potentially increasing the number of times the radio powers-up, or increasing the amount of time the radio stays powered-up. For example, second application spikes 420a-e do not occur at the same times as the first application spikes 410a-i.

Employing the techniques and structures disclosed herein, a device may employ a software layer (also referred to as a "wrapper") that provides an application program interface (API) to capture data from background applications and hold them until a desired point where radio resources may be activated and the application data transferred and tasks executed in a synchronized manner. By aggregating such tasks/data requests, frequent waking of the wireless device may be reduced and other communication resources conserved during periods where the user is not actively engaging with the device.

Figure 5:
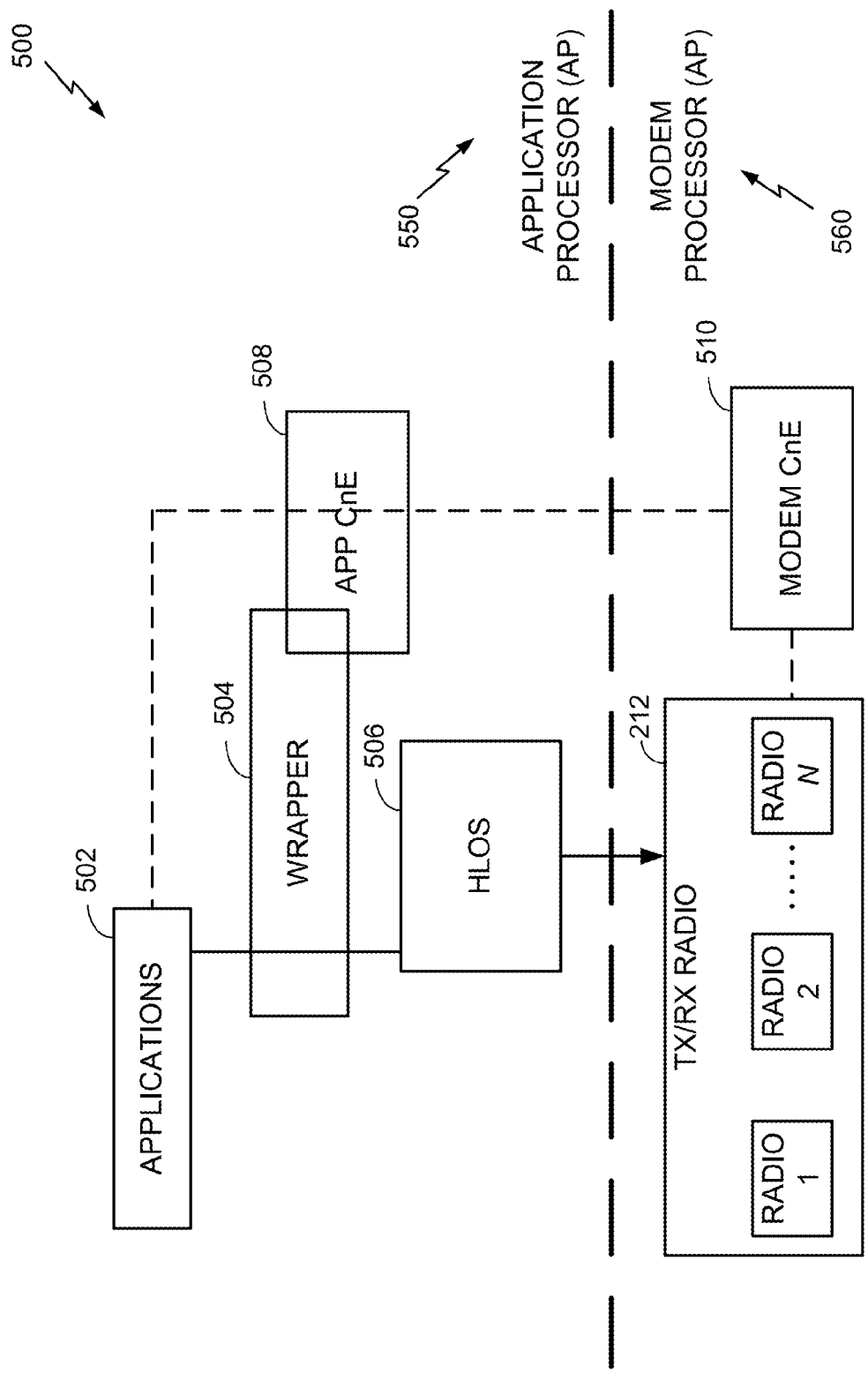
FIG. 5 shows an exemplary block diagram of a hardware/software system configured to aggregate application communication.

FIG. 5 shows an exemplary block diagram of a hardware/software system 500 configured to aggregate application communication. As shown, the software components are divided between an application processor 550 and a modem processor 560, but the various functionalities may be organized differently from the example of FIG. 5. For example, functions described as software may be implemented in hardware and vice versa, functions may be distributed differently between components, etc. In an embodiment, the hardware/software system 500 may be the communication management system 108, discussed above with respect to FIG. 1. In another embodiment, the hardware software system 500 may be implemented on the wireless device 200, described above with respect to FIG. 2. For example, functions of the application processor 550 may be implemented by one or more of the processor 202, the application layer module 206, and/or the connectivity engine 208. Functions of the modem processor 560 may be implemented by one or more of the TX/RX radio 212, the networking module 210, and/or the connectivity engine 208.

In the illustrated embodiment, applications 502 interact with an application connection engine 508 and with a high level operating system (HLOS) 506. The HLOS 506 may be, for example, the Android operating system produced by Google Inc., Mountain View, Calif. The application connection engine 508 may communicate with a modem connection engine 510. The modem connection engine may manage communication resources such as a radio 212 and the radios therein. The wrapper 504 is capable of capturing data between the applications 502 and the HLOS 506. The wrapper 504 may aggregate data from the applications 502 during a period of user inactivity and hold them until a determined time before releasing them to the HLOS 506 and ultimately the radio 212 for operation/transmission. The wrapper 504 may be invisible to the applications 502 such that they are unaware that their data/requests are being held/aggregated. In an embodiment, the wrapper 504 may emulate functions of the HLOS 506. The wrapper 504 may be a separate component or may be incorporated into another component such as the application connection engine 508. For example, the wrapper 504 may be implemented by the connectivity engine 208, described above with respect to FIG. 2.

Figure 6:
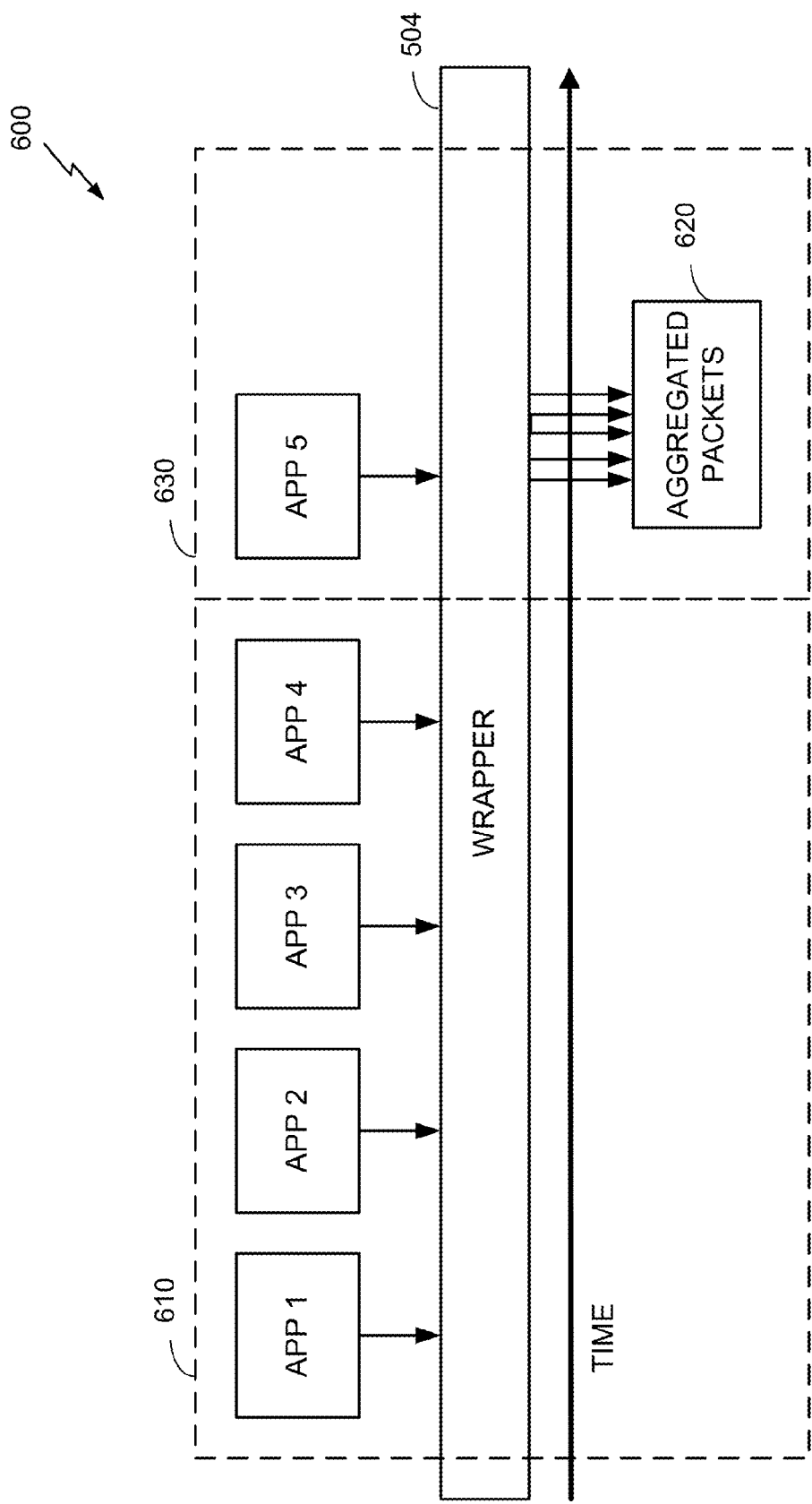
FIG. 6 shows an exemplary timeline of application communication aggregation implemented by the hardware/software system of FIG. 5.

FIG. 6 shows an exemplary timeline 600 of application communication aggregation implemented by the hardware/software system 500 of FIG. 5. As shown, applications APP 1-4 each initiate a request for use of a radio resource in succession during an aggregation period 610. In an embodiment, application communication may be delayed during the aggregation period 610. In an embodiment, the aggregation period 610 can include a period in which the device 200 and/or the TX/RX radio 212 is in the idle mode. The applications APP 1-4 may be delay-tolerant applications. Delay-tolerant applications may carry relatively time-insensitive data such as, for example, e-mail or a bulk file transfer.

In the illustrated embodiment, the application APP 1 transmits a packet, which may include a first transmit delay tolerance. Then, the application APP 2 transmits a packet, which may include a second transmit delay tolerance. Next, the application APP 3 transmits a packet, which may include a third transmit delay tolerance. Finally, the application APP 4 transmits a packet, which may include a fourth transmit delay tolerance. The wrapper 504 receives the packets (for example, via API calls such as connect( ) and write( ) socket calls). Instead of acting on the socket calls immediately, the wrapper 504 delays the communication during the aggregation period 610. At a determined time, the wrapper 504 releases the socket calls together, as aggregated packets 620.

In an embodiment, the wrapper 504 may release the aggregated packets 620 during a transmit window 630. In various embodiments, the transmit window 630 may include a period in which the device 200 is in the idle mode, and may include a period in which the device 200 is in the active mode. During the transmit window 630, one or more radio interfaces (such as, for example TX/RX radio 212) may be enabled or powered-up. The wrapper 504 may release aggregated packets 620 from APPs 1-4. The wrapper 504 may also allow application communications requests made during the transmit window 630 to proceed without delay. In other words, during the transmit window 630, the wrapper 504 may not delay further communication. For example, in the illustrated embodiment, APP 5 transmits a packet, which may include a fifth transmit delay tolerance, during the transmit window 630. The wrapper 504 packet received from APP 5 to proceed without delay.

In an embodiment, wrapper 504 may open the transmit window 630 at regular or intermittent intervals. For example, the wrapper 504 may open transmit window 630, once every 5 minutes, 10 minutes, 15 minutes, 30 minutes, 60 minutes, etc. In another example, the wrapper 504 may release delayed application communications at a random or pseudo-random time. The intervals at which the wrapper 504 opens the transmit window 630 may be determined by the device 200 or received from another device, such as the server 110 (FIG. 1).

In an embodiment, the wrapper 504 can determine when to open the transmit window 630 dynamically, based on the aggregated packets 620. For example, the wrapper 504 can open the transmit window when any of the aggregated packets 620 has experienced a delay equal to its transmit delay tolerance. In other words, once a single delayed packet has reached a threshold delay (e.g., the transmit delay tolerance), all delayed packets may be released. As another example, the wrapper 504 can open the transmit window 630 when the number of aggregated packets 620 surpasses a threshold. The threshold can be determined by the device 200 or received from another device, such as the server 110.

The wrapper 504 can keep the transmit window 630 open for a predetermined or dynamic period of time. For example, the wrapper 504 may keep the transmit window 630 open for 15 seconds, 30 seconds, 1 minute, 5 minutes, etc., after the transmit window 630 is opened. As another example, the wrapper 504 may keep the transmit window 630 open for 15 seconds, 30 seconds, 1 minute, 5 minutes, etc., after the last application communication is transmitted. The amount of time which the wrapper 504 keeps the transmit window 630 open may be determined by the device 200 or received from another device, such as the server 110. When the transmit window 630 is closed, one or more radio interfaces (such as, for example TX/RX radio 212) may be disabled or powered-down.

In an embodiment, the wrapper 504 can close the transmit window 630 after all aggregated packets 620 have been transmitted. In another embodiment, the wrapper 504 can close the transmit window 630 after all aggregated packets 620 that have been delayed longer than a threshold value have been transmitted. The threshold value for each packet may be the transmit delay tolerance. In various embodiments, the threshold delay value for each packet can be that packet's transmit delay tolerance, modified by a safety factor. For example, the threshold delay value for each packet can be that packet's transmit delay tolerance divided by a constant, or minus a constant.

In an embodiment, the wrapper 504 may open the transmit window 630 when a delay-intolerant application initiates communication. For example, APP 5 may be a delay-intolerant application. Accordingly, the wrapper 504 may open the transmit window 630 when a packet is received from APP 5. The wrapper 504 may allow the packet from APP 5 to proceed, and may also release the aggregated packets 620 from the APPs 1-4.

Figure 7:
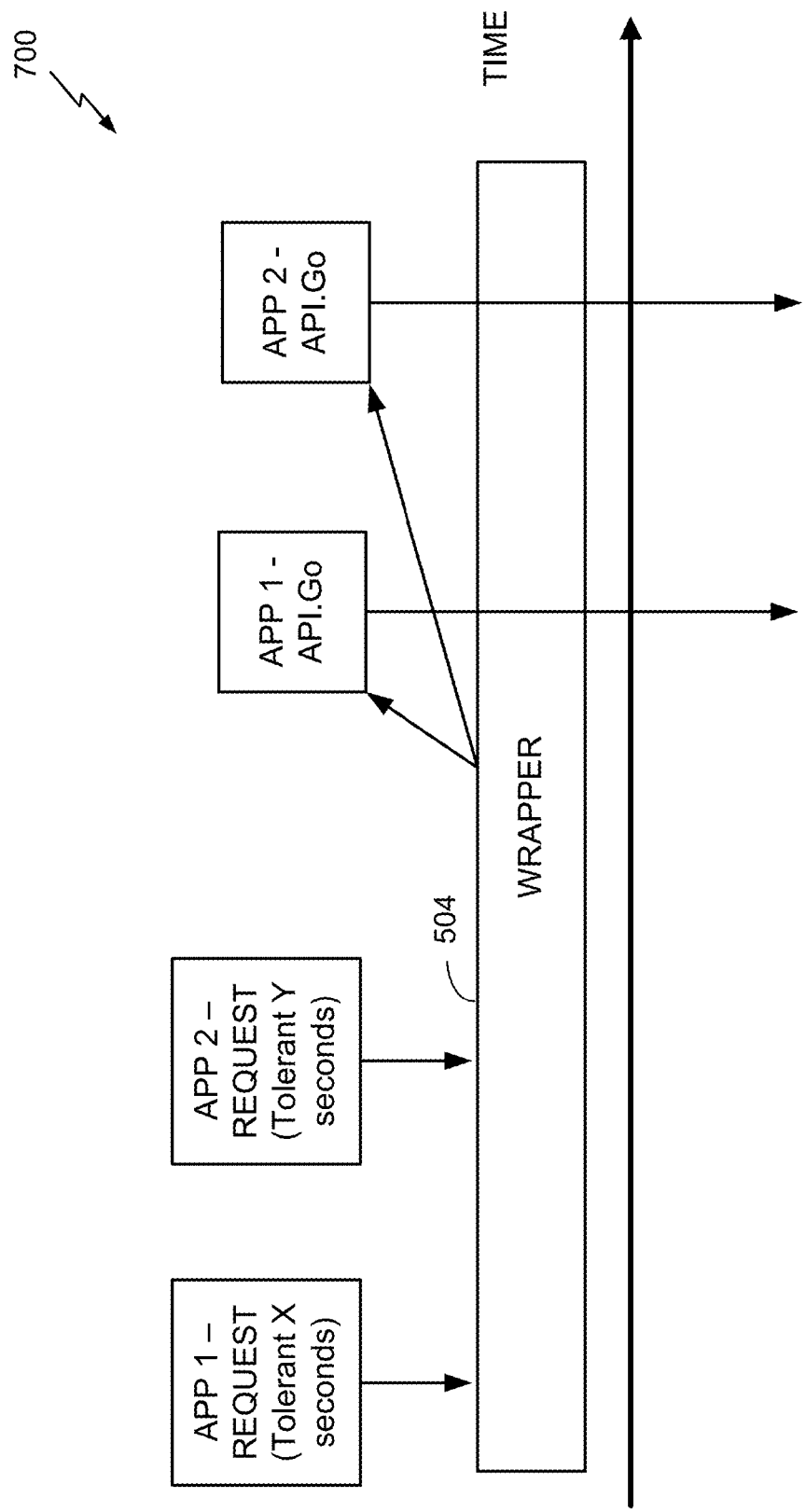
FIG. 7 shows a timeline of application communication aggregations, according to another embodiment.

FIG. 7 shows a timeline 700 of application communication aggregations, according to another embodiment. As shown, applications APP 1-2 each initiate a request for use of a radio resource in succession. The applications APP 1-2 may indicate their delay tolerance via a connection engine API. For example, the application APP 1-2 may include background activity and/or requirements for operation that are only tolerant of specific delays. For example, the applications APP 1-2 may be location tracking applications that report the location of the device 200 periodically, such as every 10 seconds.

As shown, the application APP 1 initiates a communication request, and indicates to the wrapper 504 that it will only tolerate an X-second delay. Next, the application APP 2 initiates a communication request, and indicates to the wrapper 504 that it will only tolerate a Y-second delay. The wrapper 504 may provide a callback function (e.g., API.Go), which may indicate to an application that communication is allowed. After receiving the callback, the application may proceed with communication.

As shown, the wrapper 504 provides the API.Go callback to the application APP 1 before the X-second delay has elapsed. The application APP 1 then communicates through the wrapper 504, without further delay. Similarly, the wrapper 504 provides the API.Go callback to the application APP 2 before the Y-second delay has elapsed. The application APP 2 then communicates through the wrapper 504, without further delay.

In an alternative embodiment, applications may provide the wrapper 504 with specific transmission deadlines via the API. The wrapper 504 may transparently delay communication from the applications, within the constraints of the provided deadlines. Accordingly, the wrapper 504 will allow the application communication to proceed prior to any deadlines.

In yet another aspect, the API may allow also an application to register as a delay-intolerant application. Applications that may request immediate access include child tracking applications, emergency notification applications, etc. In an embodiment, the wrapper 504 may learn the delay tolerance of various applications by monitoring the application communications. In another embodiment, the wrapper 504 may receive a list of transmit delay tolerances from a list or database, either stored locally on the device 102 or received from the server 110. The list or database may be received along with a communication access policy such as the operator policy.

The wrapper 504 may aggregate or delay application communications in a manner that reduces user disruption. The wrapper 504 may analyze a variety of factors to determine when to delay or aggregate application communication. For example, the wrapper 504 may delay application communication based on characteristics of the wireless device 102 such as a display state (on or off), an audio state (on or off), etc. The wrapper 504 may only delay application communications known to be tolerant of delay. The wrapper 504 may delay application communication when the radio is not loaded, when the wireless device is not otherwise in use (e.g., no phone calls, audio streaming, etc.). A person having ordinary skill in the art would appreciate that the wrapper 504 may determine when to delay application communication based on any combination of the above factors, in addition to other suitable factors.

Moreover, the wrapper 504 may analyze a variety of factors to determine when to release delayed or aggregated communication and to permit unrestricted application communication. For example, a delay-intolerant application (such as, for example, an emergency notification application) may initiate an unrestricted application communication. The unrestricted application communication may trigger the wrapper 504 to release previously delayed or aggregated application communications. Accordingly, previously delayed application communications may use radio resources in conjunction with the emergency application. In other words, the wrapper 504 may open a transmit window for all applications when a delay-intolerant application communication is initiated.

In an embodiment, the wrapper 504 may release delayed or aggregated application communications when a specific radio is activated or selected as a default. The specific radio may include, for example, a Wi-Fi radio, a cellular radio, a particular mode of the cellular radio (e.g. 2G or 3G communication modes), a Bluetooth radio, etc. For example, the wrapper 504 may delay application communications when only a cellular radio is enabled, and may release the delayed application communications when a Wi-Fi radio is enabled.

In another embodiment, the wrapper 504 may release delayed or aggregated application communications when a radio channel quality is above a threshold. Radio channel quality may include metrics such as signal strength, signal-to-noise ratio (SNR), etc. For example, the wrapper 504 may delay application communications when the SNR of a cellular radio is below a threshold, and may release the delayed application communications when the SNR of the cellular radio rises to or above the threshold.

In an embodiment, the wrapper 504 releases delayed or aggregated application communications when user interaction is received. For example, the wrapper 504 may release delayed application communications when a display is activated, a button press is detected, etc. In another embodiment, the wireless device 102 may anticipate user interaction. For example, the wireless device 102 may include an accelerometer that may detect movement of the wireless device 102. The wrapper 504 may release delayed application communications when accelerometer output indicates a likelihood of imminent user interaction. In another example, the wireless device 102 may anticipate user interaction via a proximity detector. A person having ordinary skill in the art will appreciate that the wrapper 504 may release delayed application communications in response to any combination of the above, and additionally in response to any other suitable event.

Although the preceding description discusses application communication aggregation and delay with respect to an API, the concepts equally apply in hardware, firmware, or any combination of hardware and software.

Figure 8:
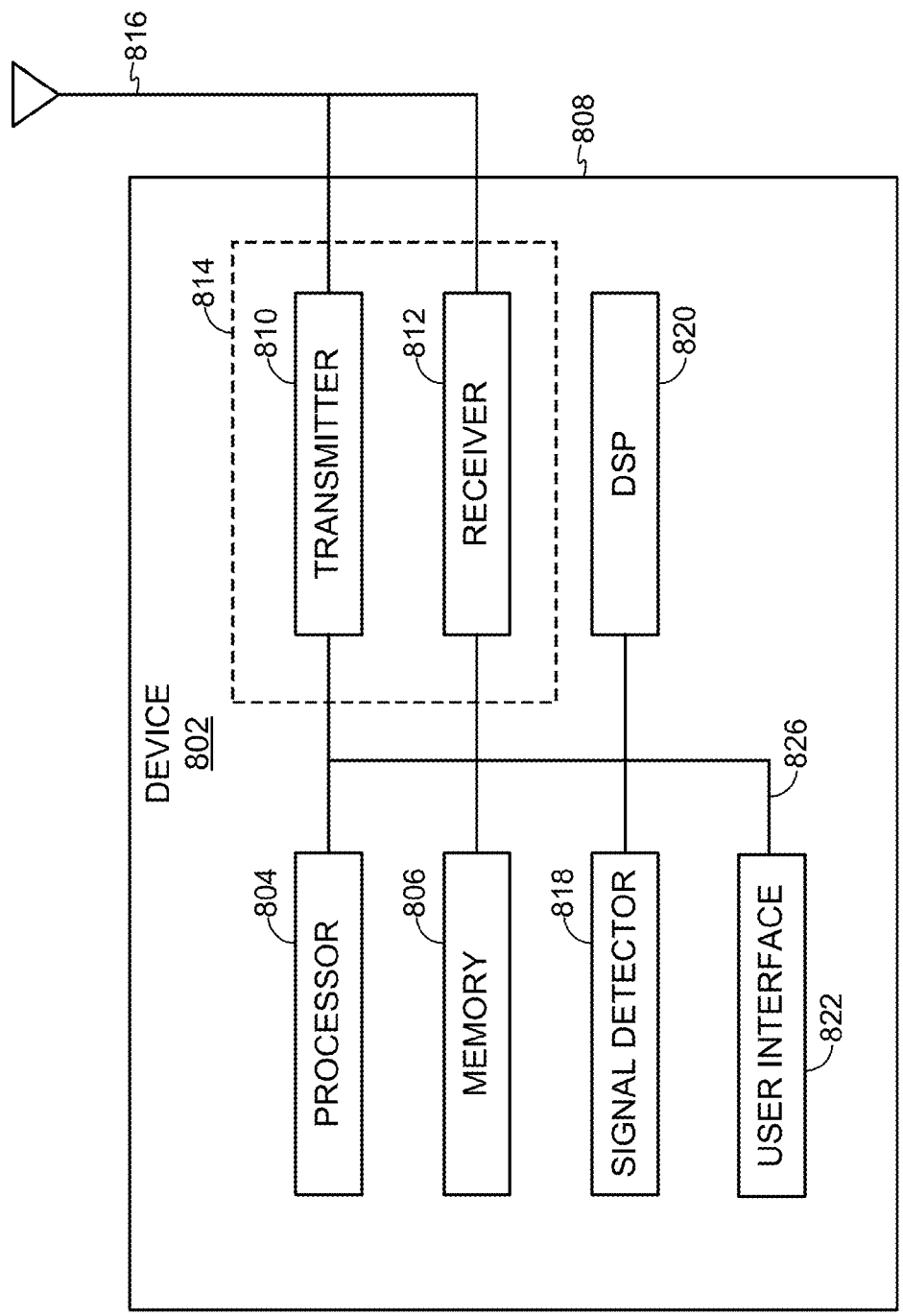
FIG. 8 shows an exemplary device configured to manage application communications.

FIG. 8 shows an exemplary device 802 configured to manage application communications. The device may be employed within the network environment 100, described above with respect to FIG. 1. The device 802 is an example of a device that may be configured to implement the various methods described herein. For example, the device 802 may implement one or more functions of the wireless device 102. In another embodiment, the device 802 may implement one or more functions of the server 110.

The device 802 may include a processor 804 which controls operation of the device 802. The processor 804 may also be referred to as a central processing unit (CPU). The memory 806, which may include both read-only memory (ROM) and random access memory (RAM), provides instructions and data to the processor 804. A portion of the memory 806 may also include non-volatile random access memory (NVRAM). The processor 804 may perform logical and arithmetic operations based on program instructions stored within the memory 806. The instructions in the memory 806 may be executable to implement the methods described herein.

When the device 802 is implemented or used as the wireless device 102, the processor 804 may be configured to execute one or more applications, which may be stored in the memory 806. During execution, the applications may initiate communication over the transceiver 814, the transmitter 810, and/or the receiver 812. The processor 804 may implement the hardware/software system 500, described above with respect to FIG. 5. For example, the processor 804 may manage application communications as described above with respect to FIGS. 6-7.

The processor 804 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The device 802 may also include a housing 808 that may include a transmitter 810 and/or a receiver 812 to allow transmission and reception of data between the device 802 and a remote location. The transmitter 810 and receiver 812 may be combined into a transceiver 814. An antenna 816 may be attached to the housing 808 and electrically coupled to the transceiver 814. In some embodiments, the antenna 816 may be omitted, and the device 802 may be configured for wired communication. The device 802 may also include (not shown) multiple transmitters, multiple receivers, multiple transceivers, and/or multiple antennas.

The device 802 may also include a signal detector 818 that may be used in an effort to detect and quantify the level of signals received by the transceiver 814. The signal detector 818 may detect such signals as total energy, energy per subcarrier per symbol, power spectral density and other signals. The device 802 may also include a digital signal processor (DSP) 820 for use in processing signals. The DSP 820 may be configured to generate a packet for transmission. In some aspects, the packet may comprise a physical layer data unit (PPDU).

The device 802 may further comprise a user interface 822 in some aspects. The user interface 822 may comprise a proximity detector, one or more input buttons, a keypad, a microphone, a speaker, an interface port (for example, a Universal Serial Bus (USB) port, a High-Definition Multimedia Interface (HDMI) port, etc.), a touchscreen, and/or a display. The user interface 822 may include any element or component that conveys information to a user of the device 802 and/or receives input from the user. In an embodiment, the user interface 822 may be considered active when it is receiving input, or sending output (for example, from a USB port, to a display, from a microphone, etc.). The user interface 822 may also be considered active when it has received input, or has sent output within a threshold time period (for example, 1 second, 1 minute, 5 minutes, etc.). The user interface 822 may be considered inactive or idle when it is not active.

When the user interface 822 receives no input, the device 802 may be said to be in an idle state, or an idle mode. In the idle state, a display may be off, and one or more functions of the device 802 may be disabled. In an embodiment, processes and communications of the device 802 that are not initiated in response to user interface 822 input may be referred to as background or idle processes or communications.

When the user interface 822 receives input, the device 802 may be said to be in an active state, or an active mode. In the active state, the display may be on, and input may have been received within an input idle period. The input idle period may be configurable and may be, for example, 1 minute. In an embodiment, background processes and communications may occur in the active mode, but may not be initiated in direct response to user interface 822 input.

The various components of the device 802 may be coupled together by a bus system 826. The bus system 826 may include a data bus, for example, as well as a power bus, a control signal bus, and a status signal bus in addition to the data bus. Those of skill in the art will appreciate the components of the device 802 may be coupled together or accept or provide inputs to each other using some other mechanism.

Although a number of separate components are illustrated in FIG. 8, those of skill in the art will recognize that one or more of the components may be combined or commonly implemented. For example, the processor 804 may be used to implement not only the functionality described above with respect to the processor 804, but also to implement the functionality described above with respect to the signal detector 818 and/or the DSP 820. Further, each of the components illustrated in FIG. 8 may be implemented using a plurality of separate elements.

Figure 9:
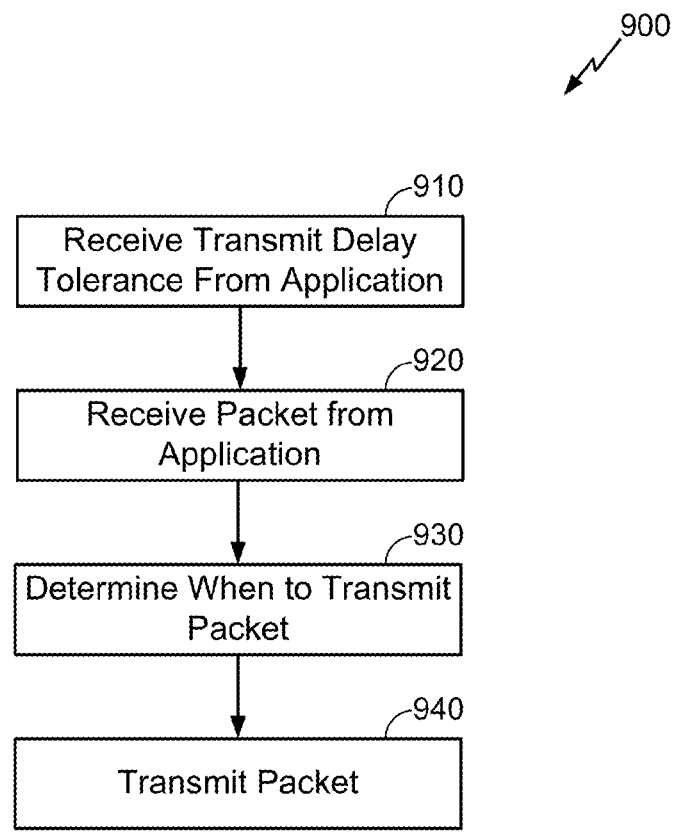
FIG. 9 shows a flowchart of an exemplary method of managing application communications.

FIG. 9 shows a flowchart 900 of an exemplary method of managing application communications. In one embodiment, one or more aspects of the flowchart 900 can correspond to block 308 of FIG. 3. Although the method of flowchart 900 is described herein with reference to the device 802 discussed above with respect to FIG. 8, a person having ordinary skill in the art will appreciate that the method of flowchart 900 may be implemented by the wireless device 102 discussed above with respect to FIG. 1, the wireless device 202 discussed above with respect to FIG. 2, and/or any other suitable device. In an embodiment, the steps in flowchart 900 may be performed by the processor 805 in conjunction with the transmitter 810, the receiver 812, the memory 806, and the user interface 822. Although the method of flowchart 900 is described herein with reference to a particular order, in various embodiments, blocks herein may be performed in a different order, or omitted, and additional blocks may be added.

First, at block 910, the device 802 receives the transmit delay tolerance from an application. In an embodiment, the transmit delay tolerance is received in a packet. In an embodiment, the transmit delay tolerance is received via the API described above. The processor 804 may store the transmit delay tolerance in the memory 806. In an embodiment, the device 802 receives the transmit delay tolerance from the server 110. As discussed above with respect to FIGS. 7-8, the transmit delay tolerance may specify how the device 802 should delay application communication.

Next, at block 920, the processor 804 receives one or more communications (e.g. a packet) from an application executing on the processor 804. The processor 804 may intercept the communications via facilities described above with respect to the communication management system 108 and/or the connectivity engine 208. In an embodiment, the DSP 820, the signal detector 818, the transmitter 810, and/or the transceiver 814 may intercept the communications. When the packet is received, the transceiver 814 (including one or more of the transmitter 810 and the receiver 812) may be in a powered-off, disabled, inactive, and/or idle state.

Then, at block 930, the processor 804 determines when to transmit the packet. For example, the processor 804 may determine a delay threshold as described above with respect to FIGS. 6-7. In an embodiment, the processor 804 may determine when to open and close the transmit window 630. Subsequently, at block 940, the processor 804 transmits the packet via the transmitter 810 at the time determined at block 930. Before the packet is transmitted, the processor 804 may power-on, enable, and/or activate the transceiver 814.

Figure 10:
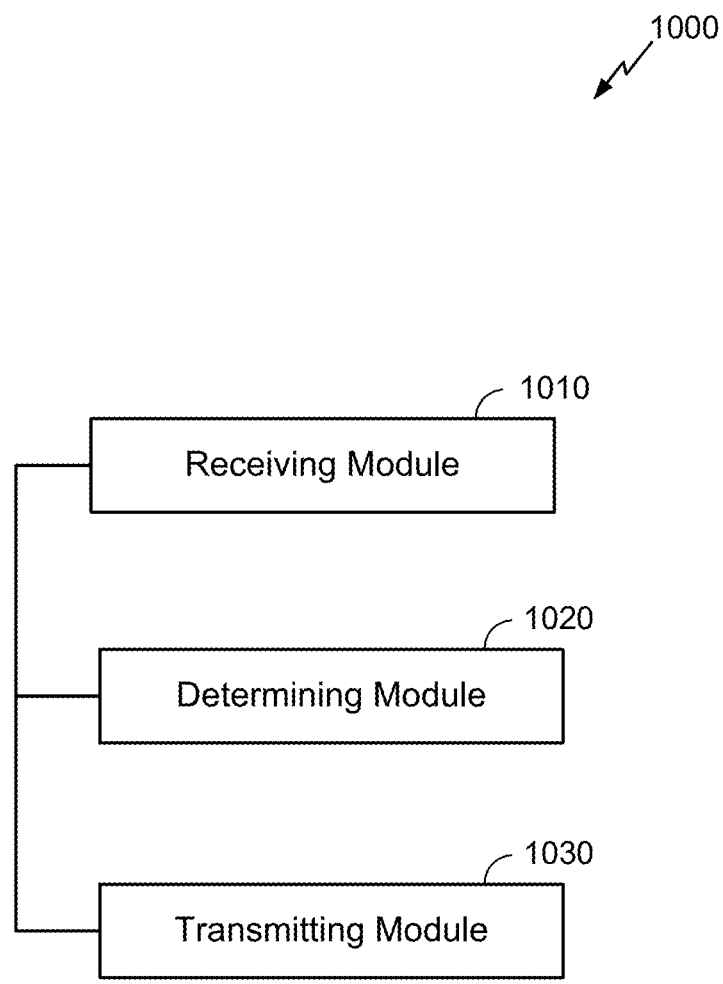
FIG. 10 shows another exemplary device configured to manage application communications.

FIG. 10 shows another exemplary device 1000 configured to manage application communications. The device 1000 comprises a receiving module 1010, a determining module 1020, and a transmitting module 1030. The receiving module 1010 may be configured to perform one or more of the functions discussed above with respect to the block 910 and/or the block 920 illustrated in FIG. 9. The receiving module 1010 may correspond to one or more of the receiver 812, the processor 804, the transceiver 814, and the memory 806, discussed above with respect to FIG. 8. The receiving module 1010 may also correspond to one or more of the TX/RX radio 212 and the processor 202 (including the application layer module 206, the networking module 210, and the connectivity engine 208), discussed above with respect to FIG. 2.

The determining module 1020 may be configured to perform one or more of the functions discussed above with respect to the block 930 illustrated in FIG. 9. The determining module 1020 may correspond to one or more of the processor 804, the DSP 820, and the memory 808 discussed above with respect to FIG. 8. The determining module 1020 may also correspond to one or more of the processor 202 and the memory 204 discussed above with respect to FIG. 2.

The transmitting module 1030 may be configured to perform one or more of the functions discussed above with respect to the block 940 illustrated in FIG. 9. The transmitting module 1030 may correspond to one or more of the processor 804 and the transmitter 810, discussed above with respect to FIG. 8. The transmitting module 1030 may correspond to one or more of the transmitter 810, the processor 804, the transceiver 814, and the memory 806, discussed above with respect to FIG. 8. The transmitting module 1030 may also correspond to one or more of the TX/RX radio 212 and the processor 202, discussed above with respect to FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the invention. Various modifications to these exemplary embodiments will be readily apparent to those skilled in the art, and the generic principles defined herein may be applied to other embodiments without departing from the spirit or scope of the invention. Thus, the invention is not intended to be limited to the exemplary embodiments shown herein but is to be accorded the widest scope consistent with the principles and novel features disclosed herein.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of aggregating data for transmission, the method comprising:
   receiving information from an application, via an application programming interface, indicative of a first transmit delay tolerance associated with a first type of packet;
   receiving information from the application, via the application programming interface, indicative of a second transmit delay tolerance associated with a second type of packet;
   receiving, via the application programming interface, a packet from the application; and
   determining when to transmit the packet based on whether the packet is of the first type or of the second type.

2. The method of claim 1, wherein receiving information from the application indicative of at least one of the first or second transmit delay tolerance comprises retrieving information from a memory written by the application via the application programming interface.

3. The method of claim 1, wherein receiving information from the application indicative of at least one of the first or second transmit delay tolerance comprises receiving a header of the packet.

4. The method of claim 1, wherein the information indicative of at least one of the first or second transmit delay tolerance comprises information indicative of a number of temporal units.

5. The method of claim 1, wherein determining when to transmit the packet of data is based on whether an amount of time elapsed from receiving the packet of data exceeds an amount of time based on at least one of the first or second transmit delay tolerance.

6. The method of claim 1, wherein determining when to transmit the packet comprises aggregating multiple packets to save battery power.

7. The method of claim 1, further comprising determining whether the packet is of the first type or of the second type.

8. A wireless device for aggregating data for transmission, the wireless device comprising:
   a processor configured to:
      receive information from an application, via an application programming interface, indicative of a first transmit delay tolerance associated with a first type of packet;
      receive information from the application, via the application programming interface, indicative of a second transmit delay tolerance associated with a second type of packet; and
      receive, via the application programming interface, a packet from the application; and
   a network driver configured to determine when to transmit the packet based on whether the packet is of the first type or of the second type.

9. The wireless device of claim 8, further comprising a memory, wherein the processor is further configured to retrieve information from the memory written by the application via the application programming interface.

10. The wireless device of claim 8, wherein the processor is further configured to receive information from the application indicative of at least one of the first or second transmit delay tolerance in a header of the packet.

11. The wireless device of claim 8, wherein the information indicative of at least one of the first or second transmit delay tolerance comprises information indicative of a number of temporal units.

12. The wireless device of claim 8, wherein the processor is further configured to determine when to transmit the packet of data based on whether an amount of time elapsed from receiving the packet of data exceeds an amount of time based on at least one of the first or second transmit delay tolerance.

13. The wireless device of claim 8, wherein the processor is further configured to determine when to transmit the packet by aggregating multiple packets to save battery power.

14. The wireless device of claim 8,
   wherein the processor is further configured to determine whether the packet is of the first type or of the second type.

15. A wireless device for aggregating data for transmission, the wireless device comprising:
   means for receiving information from an application, via an application programming interface, indicative of a first transmit delay tolerance associated with a first type of packet;
   means for receiving information from the application, via the application programming interface, indicative of a second transmit delay tolerance associated with a second type of packet;
   means for receiving, via the application programming interface, a packet from the application; and
   means for determining when to transmit the packet based on whether the packet is of the first type or of the second type.

16. The wireless device of claim 15, wherein the means for receiving information from the application indicative of at least one of the first or second transmit delay tolerance comprises means for retrieving information from a memory written by the application via the application programming interface.

17. The wireless device of claim 15, wherein the means receiving information from the application indicative of at least one of the first or second transmit delay tolerance comprises means for receiving a header of the packet.

18. The wireless device of claim 15, wherein the information indicative of at least one of the first or second transmit delay tolerance comprises information indicative of a number of temporal units.

19. The wireless device of claim 15, wherein determining when to transmit the packet of data is based on whether an amount of time elapsed from receiving the packet of data exceeds an amount of time based on at least one of the first or second transmit delay tolerance.

20. The wireless device of claim 15, wherein the means for determining when to transmit the packet comprises means for aggregating multiple packets to save battery power.

21. The wireless device of claim 15, further comprising means for determining whether the packet is of the first type or of the second type.

22. A non-transitory computer-readable medium having instruction encoded thereon which, when executed, cause an apparatus to perform a method of aggregating data for transmission, the method comprising:
- receiving information from an application, via an application programming interface, indicative of a first transmit delay tolerance associated with a first type of packet;
- receiving information from the application, via the application programming interface, indicative of a second transmit delay tolerance associated with a second type of packet;
- receiving, via the application programming interface, a packet from the application; and
- determining when to transmit the packet based on whether the packet is of the first type or of the second type.

23. The medium of claim 22, wherein receiving information from the application indicative of at least one of the first or second transmit delay tolerance comprises retrieving information from a memory written by the application via the application programming interface.

24. The medium of claim 22, wherein receiving information from the application indicative of at least one of the first or second transmit delay tolerance comprises receiving a header of the packet.

25. The medium of claim 22, wherein the information indicative of at least one of the first or second transmit delay tolerance comprises information indicative of a number of temporal units.

26. The medium of claim 22, wherein determining when to transmit the packet of data is based on whether an amount of time elapsed from receiving the packet of data exceeds an amount of time based on at least one of the first or second transmit delay tolerance.

27. The medium of claim 22, wherein determining when to transmit the packet comprises aggregating multiple packets to save battery power.

28. The medium of claim 22, wherein receiving the packet comprises determining whether the packet is of the first type or of the second type.

\* \* \* \* \*